May 9, 1967
T. D. CRAIG
3,318,338
JACKETED STRIP-WOUND METAL HOSE
Filed Aug. 13, 1964
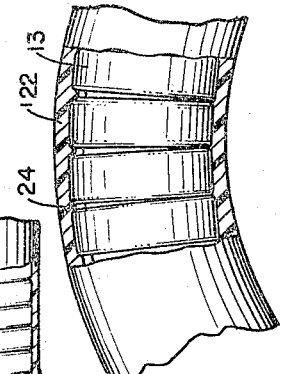
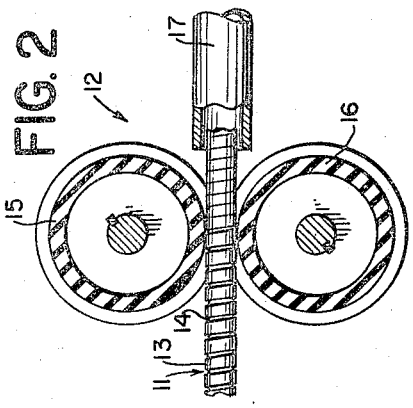
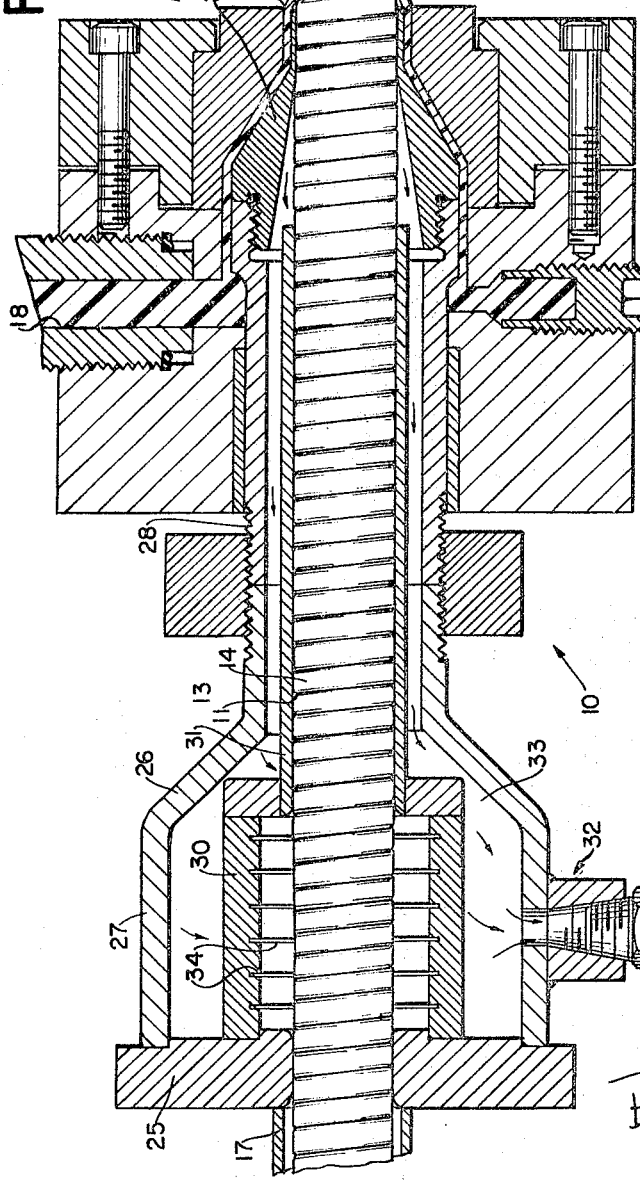
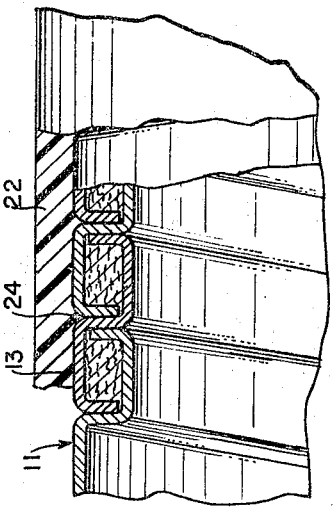
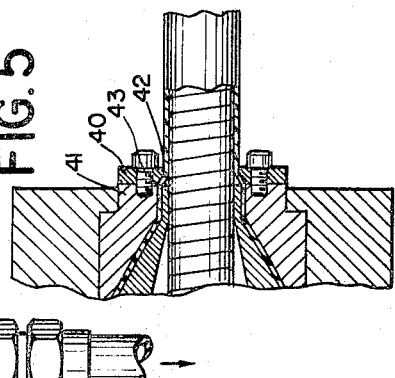
INVENTOR.
THOMAS DONALD CRAIG
BY
Pennie, Edmonds, Morton, Taylor and Adams
ATTORNEYS

United States Patent Office 3,318,338
Patented May 9, 1967

3,318,338
JACKETED STRIP-WOUND METAL HOSE
Thomas Donald Craig, Mattoon, Ill., assignor to Anaconda American Brass Company, a corporation of Connecticut
Filed Aug. 13, 1964, Ser. No. 389,310
2 Claims. (Cl. 138—131)

This invention relates to the manufacture of jacketed strip-wound metal hose; it particularly provides an improved jacketed metal hose and an improved method for applying a jacket of plastic material by an extrusion operation to a flexible metal hose of the strip-wound type.

Jacketed strip-wound metal hose of the type over which the metal hose of the invention is an improvement generally has the construction shown in U.S. Patent No. 3,073,351 and the method of the invention is an improvement over the method described in U.S. Patent No. 3,015,133. In these patents the jacket is applied to the strip-wound hose when the hose is in an axially compressed position such that upon bending the jacketed metal hose formed in this manner, adjacent convolutions can move away from each other only on the outside of the bend and since the convolutions on the inside of the bend cannot move toward each other wrinkling of the cover is substantially prevented. Jacketed strip-wound metal hoses of this type are well protected against leakage, in or out, of moisture or other liquids for the jacket is itself a seamless, liquid-and-gas-tight tubing. At the same time, the hose has the mechanical ruggedness of the strip-wound metal hose itself, and it is as flexible as the metal hose used in its manufacture. It has been found, however, that upon cutting of a portion of the jacketed hose, the metal tubing tends to be axially displaced out of the jacket at the end portion where the cut has been made. This is possible because the convolutions of the metal hose are held in their axial compressed position by frictional engagement of the jacket alone. It is, therefore, an object of this invention to provide a jacketed strip-wound metal hose of this type by which axial displacement of the metal hose relative to the jacket is restricted by a mechanical interlock therebetween while retaining all the flexible characteristics of this type hose. It is a further object to provide a method for making the hoses.

Broadly stated, the invention comprises jacketed strip-wound metal hose having axially interlocking helical convolutions in which each convolution is movable to an axially compressed position relative to adjoining convolutions such that there is only a small space between adjoining convolutions and an axially extended position in which adjoining convolutions are spaced a substantial distance apart. A seamless jacket of plastic material fits snugly about the outer surface of said hose and substantially fills the space between adjoining convolutions when said hose is unbent and in said axially compressed position with its axis substantially straight to provide a mechanical interlock between the jacket and the hose. By this construction, axial displacement of the jacket relative to the hose is substantially precluded by the mechanical interlock between the jacket and hose, and upon bending of the jacketed hose adjacent convolutions can move away from each other only on the outside of the bend and wrinkling of the jacket due to movement of convolutions toward each other on the inside of the bend is substantially prevented. The jacketed strip-wound metal hose is particularly characterized by material which is vacuum-formed into the small space between convolutions when the metal hose is in its axially compressed position.

The improved method of the invention is to be used in a method of jacketing strip-wound flexible metal hose having axially interlocking helical convolutions in which each convolution is movable relative to adjoining convolutions axially of the hose through the interlock between an axial compressed position relative to adjoining convolutions such that there is only a small space between adjoining convolutions and an axially extended position in which adjoining convolutions are spaced a substantial distance apart, wherein the metal hose is subjected to an axial force in a direction to maintain the convolutions in said axially compressed position while maintaining the axis of the hose substantially straight, and advancing the hose with its convolutions in said axially compressed position while maintaining its axis straight. The improved method is characterized by extruding a jacket of plastic material which is elastic when set about said hose as it is being advanced, with the linear velocity at which said plastic jacket material is extruded preferably being less than the linear velocity at which the hose is advanced to cause the freshly-extruded plastic jacket to be stretched and necked down snugly about the outer surface of the hose. The jacket material is forced into the space between adjoining convolutions when said hose is unbent and in its axially compresed position with its axis substantially straight to substantially fill the space therebetween and provide a mechanical interlock between the jacket and the hose. By this method axial displacement of the jacket relative to the hose is substantially precluded by the mechanical interlock, and upon bending of the jacketed hose adjacent convolutions can move away from each other only on the outside of the bend and wrinkling of the jacket due to movement of convolutions toward each other on the inside of the bend is substantially prevented. The method of the invention is particularly characterized by at least partially evacuating the helical space between adjacent convolutions of at least a portion of the hose in its axial compressed position and extruding the plastic jacket thereon such that the jacket material substantially fills the space therebetween.

A preferred embodiment of the invention is described hereinbelow with reference to the drawing wherein:

FIG. 1 is a side elevation partly in section of a portion of the extrusion apparatus used in the formation of the jacketed strip-wound metal hose of the invention;

FIG. 2 is a side elevation on a smaller scale and partly in section of a fragmentary portion of the apparatus of FIG. 1;

FIG. 3 is an enlarged fragmentary section of the jacketed strip-wound metal hose of the invention;

FIG. 4 is a side elevation partly in section of the jacketed strip-wound metal hose which is bent; and FIG. 5 is a side elevation partly in section of a portion of a second method of extrusion apparatus for forming the jacketed strip-wound metal hose.

The apparatus shown in FIG. 1 is extrusion apparatus 10 to which and through which metal hose 11 to be jacketed is fed by a pushing device 12 shown in FIG. 2.

The metal hose 11 shown in the drawings is conventional strip-wound square locked metal hose with a fibrous packing positioned within the interlock of the convolutions. However, it may well be strip-wound interlocked metal hose (in which the side edges of each convolution are bent through about 180° instead of only about 90°), or any other type of strip-wound flexible metal hose. As the hose is drawn from a supply reel adjacent the extrusion apparatus 10, it is likely to be stretched out so that its convolutions 13 (FIG. 2) are opened, i.e. spaced apart so that the interstices or spaces 14 between them are as wide as the construction of the hose permits. When the convolutions are opened in this way, the hose is in its axially extended position. The pushing device 12 is positioned adjacent to the extrusion apparatus and serves to push adjacent convolutions as close together as the construction of the hose permits, to put the hose in its axially compressed position; the hose is in its axially compressed position when the adjacent convolutions are pushed together even though the hose construction will not permit them to abut flushly. Of course, the extent to which the hose can be axially extended or compressed and thus, the size of the space formed between adjacent convolutions in their respective positions is determined by the particular construction of the strip-wound metal hose. By limiting the axial displacement of the convolutions the degree of flexibility of the hose is correspondingly limited.

The pushing device 12 shown consists of a pair of rolls 15 and 16 which grip the hose as it is being fed straight into the extrusion apparatus; and the rolls rotate at a rate which is higher than the linear velocity at which the hose is being fed to the extrusion apparatus so that adjacent convolutions are closed together. Of course it is preferred to use another pushing device to maintain the convolutions in their axially compressed position as shown in the patents referred to above. The hose is then fed into a rigid guiding tube 17, to keep the hose from buckling and to insure that its axis is straight in its passage to and through the extruding apparatus.

The extruding apparatus 10 is itself basically of conventional construction, but has been modified to perform the method of the invention. Thermoplastic or other plastic materail to be extruded about the hose (such, for example, as vinyl chloride polymer, polyethylene, a rubber composition or the like) is fed into the apparatus through a feed hopper and into the intermediate cylindrical reservoir 18. This material, heated sufficiently to be in a readily deformable plastic state, is forced under pressure out through a cylindrical extrusion die 19 in the extrusion head 20 of the apparatus. The cylindrical aperture 21 of the extrusion die 19 is slightly greater in inside diameter than the outside diameter of the metal hose 11. The linear velocity at which the plastic material is extruded through the annular die opening 21 is a little less than the linear velocity with which the tube 11, with its convolutions fully closed in the axially compressed position, is passed through an axial opening in the extrusion die. At a short distance out from the extrusion die, the extruded plastic jacket 22 is brought snugly into engagement with the outer surface of the metal hose. Hence, as the hose advances through the extrusion die, the soft plastic material just emerging from the die opening (indicated at 23) at the extrusion zone is stretched out by the advancing hose and is thereby necked down into snug engagement with the hose. In this manner a jacket which fits the hose snugly regardless of minor variations in hose diameter along its length but without being under any noticeable hoop stress is formed about the hose.

According to the improvement, the plastic material is extruded about the hose and into the spaces between adjacent convolutions. The construction of the strip-wound hose in its axially compressed position is shown in FIG. 3. The adjacent convolutions 13, with the axis straight, are in full axial compression with the convolutions in direct contact so that no further axial displacement of the convolutions toward each other is possible. As is clearly shown, even when the hose is fully axially compressed there is still a space 24 between adjacent convolutions. This space between adjacent convolutions is found in all strip-wound metal hose, regardless of the type, and it has been found that by extruding the jacket into this space an improved jacketed metal hose is realized. In FIG. 3, the square locked metal hose 11 presents substantially flat side portions between adjacent convolutions which abut each other in the axially compressed position. Thus, in this embodiment the space 24 is essentially a valley defined by the bend of the metal between adjacent convolutions. Here the plastic material which extends between adjacent convolutions extends into the valley essentially tangentially relative to the bend of the metal, and no deep penetration therebetween is effected, but this valley or space 24 is said to be substantially filled.

As shown in FIG. 1, the guiding tube 17 is attached to a back plate 25 of the extrusion apparatus through which the hose 11 is fed. Extending from the back plate 25 and connected to the extrusion apparatus adjacent the die opening is a housing 26, which has a flared large diameter portion 27 adjacent the plate 25 and an elongated smaller diameter portion 28 extending to an inner tapered annular member 29 which defines the inner diameter of the die opening. Mounted to the back plate 25 within the flared portion of the housing is a cylindrical member 30 to which is integrally mounted an elongated guide tube 31 which extends within the elongated portion 29 of the housing and has a smaller outside diameter than the inside diameter of the elongated portion so as to define an annular aperture therebetween. The guide tube 31 terminates spaced from but adjacent the annular member. Extending into the flared portion of the housing is a connection 32 which leads to a vacuum pump. Thus, the space between the housing and the cylindrical member 30 and integrally connected guide tube 31 defines a vacuum chamber 33 which leads to the outlet end of the extrusion apparatus. By operating the vacuum pump, air is evacuated in the vacuum chamber and in the spaces 24 between convolutions of the hose as it emerges from the guide tube 31 and before the plastic jacket material is extruded onto the hose. Therefore, when the plastic material is extruded about the hose 11, it will be vacuum-formed into the at least partially evacuated spaces 24 so as substantially to fill the spaces as shown in FIG. 3. It is to be noted that a series of spaced flexible discs 34 preferably having an opening of a diameter smaller than the diameter of the hose are mounted on the cylindrical member and extend radially against the advancing hose. The series of flexible discs gently wipe against the hose and into the space 24 so as to provide an obstacle to the air which would otherwise be drawn axially around the advancing hose and between the helical interstices defined by the spaces and destroy the vacuum. Promptly after formation of the extruded jacket 22, the hose is cooled to set the plastic material. This cooling is generally achieved by advancing the jacketed hose through a cooling vessel by the pushing force applied to it to advance it through the extrusion apparatus, so that no substantial tensile force or bending is imposed upon it until the jacket material has been congealed or set.

Another embodiment of apparatus for forming the jacketed hose is shown in FIG. 5 wherein a wiping die 40 is attached to the face of cylindrical extrusion die 41. The outer edge 42 defines the die opening of the wiping die 40 which is smaller than the diameter of a cylindrical aperture 43 of the extrusion die 41. It is to be noted that the die opening is outwardly bevelled toward the outer edge 42, which allows for the stretching and necking down of the soft plastic before it is wiped down. Thus, as the hose advances through the extrusion die, the extruded plastic jacket is brought snugly into engagement with the outer surface of the metal base, and as the hose advances through the extrusion die, the soft plastic material just emerging from the die opening at the extrusion zone is stretched out by the advancing hose and is thereby necked down into snug engagement with the hose. At this point the die 42 at its outer edge wipes the soft plastic material into the space between adjacent convolutions as described above.

Jacketed hose prepared in this manner is shown in FIGS. 3 and 4. In the completed hose, the jacket is in frictional engagement with the hose and has a radially and helically extending internal rib formed along the inner wall of the jacket, which is positioned within the spaces 24 between convolutions when the hose is unbent and in its axially compressed position with its axis substantially straight to provide a mechanical interlock between the jacket and the hose so that axial displacement of the jacket relative to the hose is substantially precluded. However, the ability of the hose to flex is not thereby impaired. As shown in FIG. 4, bending the hose simply causes the convolutions to open on the convex side of the bend, and to stretch the thermoplastic material correspondingly without causing the material to be stretched out of the spaces between convolutions. There is and can be no movement of adjacent convolutions toward each other on the concave side of the bend, with attendant compression and wrinkling of the jacket material. Hence the hose when bent preserves the same smooth and unwrinkled appearance it has when straight. When the hose is straightened again, the adjacent convolutions are returned to the closed position and the stretched thermoplastic contracts again. Thus, the jacket remains free of objectionable wrinkles whether or not the hose is bent. It will be noted that the jacket forms a smooth cylindrical outer layer, even though formed in the spaces between convolutions, which does not present any obstacle to the movement of the convolutions toward and away from each other.

A feature of the hose produced as described above is that the jacket fits snugly about the outer surface of the metal hose throughout the entire length of the hose, regardless of minor commercial manufacturing variations in the hose diameter. At the same time the jacket is free from any noticeable hoop stress throughout the entire length of the hose. The jacket does not bunch or wrinkle; yet neither do the edges of any cut that may inadvertently be made in the jacket tend to make the cut run lengthwise of the hose. The hose thus retains a neat and attractive appearance under all conditions of use, and injury to the jacket does not tend to be self-propogated, or to enlarge in any way.

Additionally, by virtue of the positioning of the jacket material within the small space between adjacent convolutions when the hose is in its axially compressed position, a mechanical interlock is formed between the jacket and the hose which will preclude axial displacement of the jacket relative to the hose, particularly at end portions of the hose upon cutting. Moreover, since the jacket material is positioned within the space while the hose is in its axially compressed position, the presence of the material therein does not impair the flexibility of the hose in any way. Of course, the flexibility of the hose can be limited by the particular construction of the hose itself, but as long as the jacket material is applied within the space btween adjacent convolutions when the hose is in its axially compressed position, the flexibility of the particular hose will not be affected.

I claim:
1. Jacketed strip-wound metal hose having axially interlocking helical convolutions in which each convolution is movable to a fully axially compressed position in which adjoining convolutions are in direct contact with one another such that there is only a small space between the convolutions at their outer surfaces and an axially extended position in which adjoining convolutions are spaced a substantial distance apart, and a seamless jacket of plastic material fitting snugly about the outer surface of said hose and substantially filling said space between adjoining convolutions when said hose is unbent and in said axially compressed position with its axis substantially straight to provide a mechanical interlock between the jacket and the hose, whereby axial displacement of the jacket relative to the hose is substantially precluded by said mechanical interlock and upon bending of the jacketed hose adjacent convolutions can move away from each other only on the outside of the bend and wrinkling of the jacket due to movement of convolutions toward each other on the inside of the bend is substantially precluded.

2. Jacketed strip-wound metal hose having axially interlocking helical convolutions in which each convolution is movable to a fully axially compressed position in which adjoining convolutions are in direct contact with one another such that there is only a small space between the convolutions at their outer surfaces and an axially extended position in which adjoining convolutions are spaced a substantial distance apart, and a seamless jacket of plastic material fitting snugly about the outer surface of said hose and vacuum-formed into and substantially filling said space between adjoining convolutions when said hose is unbent and in said axially compressed position with its axis substantially straight to provide a mechanical interlock between the jacket and the hose, whereby axial displacement of the jacket relative to the hose is substantially precluded by said mechanical interlock and upon bending of the jacketed hose adjacent convolutions can move away from each other only on the outside of the bend and wrinkling of the jacket due to movement of convolutions toward each other on the inside of the bend is substantially precluded.

References Cited by the Examiner
UNITED STATES PATENTS

| | | | |
|---|---|---|---|
| 783,361 | 2/1905 | Briefs | 138—131 |
| 2,550,576 | 4/1951 | Marshall | 138—131 |
| 3,073,351 | 1/1963 | Nichols | 138—131 |

LAVERNE D. GEIGER, *Primary Examiner.*

SAMUEL ROTHBERG, *Examiner.*

T. L. MOORHEAD, *Assistant Examiner.*